United States Patent
Seshimo et al.

(10) Patent No.: US 9,850,350 B2
(45) Date of Patent: Dec. 26, 2017

(54) BLOCK COPOLYMER, METHOD OF PRODUCING BLOCK COPOLYMER, AND METHOD OF PRODUCING STRUCTURE CONTAINING PHASE-SEPARATED STRUCTURE

(71) Applicants: TOKYO OHKA KOGYO CO., LTD., Kawasaki-shi (JP); TOKYO INSTITUTE OF TECHNOLOGY, Tokyo (JP)

(72) Inventors: Takehiro Seshimo, Kawasaki (JP); Teruaki Hayakawa, Kawasaki (JP)

(73) Assignees: TOKYO OHKA KOGYO CO., LTD., Kawasaki-Shi (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 15/055,018

(22) Filed: Feb. 26, 2016

(65) Prior Publication Data

US 2016/0257789 A1 Sep. 8, 2016

(30) Foreign Application Priority Data

Mar. 2, 2015 (JP) .................................. 2015-039848
Aug. 24, 2015 (JP) .................................. 2015-164827

(51) Int. Cl.
C08G 77/42 (2006.01)
C08G 77/46 (2006.01)
C08G 77/442 (2006.01)

(52) U.S. Cl.
CPC ........... *C08G 77/42* (2013.01); *C08G 77/442* (2013.01); *C08G 77/46* (2013.01)

(58) Field of Classification Search
CPC ........ C08G 77/22; C08G 77/24; C08G 77/26; C08G 77/28; C08G 77/30; C08G 77/38; C08G 77/382; C08G 77/388; C08G 77/392; C08G 77/42–77/46; C08G 77/442
See application file for complete search history.

(56) References Cited

U.S. PATENT DOCUMENTS

| | | | | | |
|---|---|---|---|---|---|
| 5,468,477 | A | * | 11/1995 | Kumar | A61K 8/39 424/49 |
| 2001/0037001 | A1 | * | 11/2001 | Muller | C08F 2/48 525/329.4 |
| 2002/0120057 | A1 | * | 8/2002 | Gosselink | A61K 8/898 524/588 |
| 2010/0036062 | A1 | * | 2/2010 | Okawa | A61K 8/894 525/474 |
| 2013/0231438 | A1 | * | 9/2013 | Kim | B82Y 10/00 524/500 |

FOREIGN PATENT DOCUMENTS

JP  A-2008-036491  2/2008

OTHER PUBLICATIONS

"Controlled Thiol-ene Functionalization of Polyferrocenylsilane-block-Polyvinylsiloxane Copolymers" authored by Lunn et al. and published in Macromolecular Chemical Physics (2013) 214, 2813-2820.*
Hinsberg et al., Self-Assembling Materials for Lithographic Patterning: Overview, Status and Moving Forward, Proceedings of SPIE, vol. 7637, 76370G-1-76370G-11, 2010.
Huda et al., Fabrication of 10-nm-Order Block Copolymer Self-Assembled Nanodots for High-Density Magnetic Recording, Japanese Journal of Applied Physics, vol. 50, 06GG06, Jun. 20, 2011.
Gotrik et al., Morphology Control in Block Copolymer Films Using Mixed Solvent Vapors, ACS Nano vol. 6, pp. 8052-8059, Aug. 28, 2012.

* cited by examiner

*Primary Examiner* — Marc Zimmer
(74) *Attorney, Agent, or Firm* — Knobbe Martens Olson & Bear LLP

(57) ABSTRACT

A block copolymer containing a first block having a structure represented by general formula (1) shown below ($Rs^{01}$ and $Rs^{02}$ each independently represents an organic group, provided that at least one of $Rs^{01}$ and $Rs^{02}$ has a polar group; and * represents a valence bond).

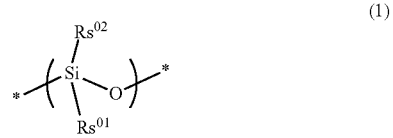

(1)

10 Claims, 1 Drawing Sheet

BLOCK COPOLYMER, METHOD OF PRODUCING BLOCK COPOLYMER, AND METHOD OF PRODUCING STRUCTURE CONTAINING PHASE-SEPARATED STRUCTURE

TECHNICAL FIELD

The present invention relates to a block copolymer, a method of producing block copolymer, and a method of producing structure containing phase-separated structure.

Priority is claimed on Japanese Patent Application No. 2015-039848, filed Mar. 2, 2015, and Japanese Patent Application No. 2015-164827, filed Aug. 24, 2015, the contents of which are incorporated herein by reference.

DESCRIPTION OF RELATED ART

Recently, as further miniaturization of large scale integrated circuits (LSI) proceeds, a technology for processing a more delicate structure is demanded. In response to such demand, attempts have been started on forming a fine pattern using a phase-separated structure formed by self-assembly of block polymers having mutually incompatible blocks bonded together. (For example, Patent Literature 1).

For using a phase-separation structure of a block copolymer, it is necessary to form a self-organized nano structure by a microphase separation only in specific regions, and arrange the nano structure in a desired direction. For realizing position control and orientational control, processes such as graphoepitaxy to control phase-separated pattern by a guide pattern and chemical epitaxy to control phase-separated pattern by difference in the chemical state of the substrate are proposed (see, for example, Non-Patent Document 1).

A block copolymer forms a regular periodic structure by phase separation. The periodic structure changes to a cylinder, a lamellar or a sphere, depending on the volume ratio or the like of the polymer components. Further, it is known that the period depends on the molecular weight.

Attempts have been made to form fine patterns having a perpendicular cylinder shape in which cylinders are oriented in a perpendicular direction, a horizontal cylinder shape in which cylinders are oriented in a horizontal direction, and a perpendicular lamellar shape in which lamellars are oriented in a perpendicular direction. For example, in Non-Patent Literature 2, attempt is made to form a horizontal cylinder shape using a block copolymer constituted of polystyrene and polydimethylsiloxane. Further, in Non-Patent Literature 3, attempt has been made to form a perpendicular cylinder shape by solvent annealing using a block copolymer constituted of polystyrene and polydimethylsiloxane.

DOCUMENTS OF RELATED ART

Patent Literature

[Patent Document 1] Japanese Unexamined Patent Application, First Publication No. 2008-36491

Non-Patent Documents

[Non-Patent Document 1] Proceedings of SPIE (U.S.), vol. 7637, pp. 76370G-1 (2010)
[Non-Patent Document 2] Jpn. J. Appl. Phys. 50 (2011) 06GG06.
[Non-Patent Document 3] ACS Nano 6 (2012) 8052.

SUMMARY OF THE INVENTION

However, in the method disclosed in Non-Patent Literature 2, since the surface free energy of polydimethylsiloxane is lower than that of polystyrene, polydimethylsiloxane is likely to be segregated on the surface layer after heat annealing. Therefore, in order to form a pattern, it becomes necessary to separately conduct an etching step, and it was difficult to form a perpendicular cylinder structure suitable for microprocessing.

Further, as described in Non-Patent Literature 3, in a process which requires solvent annealing, a large-scale apparatus becomes necessary. Therefore, there was a problem that industrial development was difficult.

The present invention takes the above circumstances into consideration, with an object of providing a block copolymer preferable in the production of a structure suitable for microprocessing, a method of producing a block copolymer, and a method of producing a structure containing a phase-separated structure.

A first aspect of the present invention is a block copolymer containing a first block having a structure represented by general formula (1) shown below.

[Chemical Formula 1]

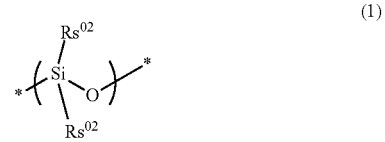

In the formula, $Rs^{01}$ and $Rs^{02}$ each independently represents an organic group, provided that at least one of $Rs^{01}$ and $Rs^{02}$ has a polar group; and * represents a valence bond.

A second aspect of the present invention is a method of producing a block copolymer according to the first aspect, the method including a step A in which a block copolymer precursor is produced, and a step B in which a first block of the block copolymer precursor polymerized in step A is reacted with a compound containing an organic group having a polar group.

A third aspect of the present invention is a method of producing a structure containing a phase-separated structure, the method including a step 1 in which a layer containing the block copolymer according to the first aspect of the present invention is formed on a substrate, and a step 2 in which the layer containing the block copolymer is phase-separated.

In the present description and claims, the term "aliphatic" is a relative concept used in relation to the term "aromatic", and defines a group or compound that has no aromaticity.

The term "alkyl group" includes linear, branched or cyclic, monovalent saturated hydrocarbon, unless otherwise specified.

The term "alkylene group" includes linear, branched or cyclic, divalent saturated hydrocarbon, unless otherwise specified. The same applies for the alkyl group within an alkoxy group.

A "halogenated alkyl group" is a group in which part or all of the hydrogen atoms of an alkyl group is substituted with a halogen atom. Examples of the halogen atom include a fluorine atom, a chlorine atom, a bromine atom and an iodine atom.

A "fluorinated alkyl group" or a "fluorinated alkylene group" is a group in which part or all of the hydrogen atoms of an alkyl group or an alkylene group have been substituted with a fluorine atom.

The term "structural unit" refers to a monomer unit that contributes to the formation of a polymeric compound (resin, polymer, copolymer).

A "structural unit derived from an acrylate ester" refers to a structural unit that is formed by the cleavage of the ethylenic double bond of an acrylate ester.

An "acrylate ester" refers to a compound in which the terminal hydrogen atom of the carboxy group of acrylic acid ($CH_2$=CH—COOH) has been substituted with an organic group.

The acrylate ester may have the hydrogen atom bonded to the carbon atom on the α-position substituted with a substituent. The substituent that substitutes the hydrogen atom bonded to the carbon atom on the α-position is atom other than hydrogen or a group, and examples thereof include an alkyl group of 1 to 5 carbon atoms, a halogenated alkyl group of 1 to 5 carbon atoms and a hydroxyalkyl group. A carbon atom on the α-position of an acrylate ester refers to the carbon atom bonded to the carbonyl group, unless specified otherwise.

Hereafter, an acrylate ester having the hydrogen atom bonded to the carbon atom on the α-position substituted with a substituent is sometimes referred to as "α-substituted acrylate ester". Further, acrylate esters and α-substituted acrylate esters are collectively referred to as "(α-substituted) acrylate ester".

A "structural unit derived from a hydroxystyrene derivative" refers to a structural unit that is formed by the cleavage of the ethylenic double bond of a hydroxystyrene derivative.

The term "hydroxystyrene derivative" includes compounds in which the hydrogen atom at the α-position of hydroxystyrene has been substituted with another substituent such as an alkyl group or a halogenated alkyl group; and derivatives thereof. Examples of the derivatives thereof include hydroxystyrene in which the hydrogen atom of the hydroxy group has been substituted with an organic group and may have the hydrogen atom on the α-position substituted with a substituent; and hydroxystyrene which has a substituent other than a hydroxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

As the substituent which substitutes the hydrogen atom on the α-position of hydroxystyrene, the same substituents as those described above for the substituent on the α-position of the aforementioned α-substituted acrylate ester can be mentioned.

A "structural unit derived from vinylbenzoic acid or a vinylbenzoic acid derivative" refers to a structural unit that is formed by the cleavage of the ethylenic double bond of vinylbenzoic acid or a vinylbenzoic acid derivative.

The term "vinylbenzoic acid derivative" includes compounds in which the hydrogen atom at the α-position of vinylbenzoic acid has been substituted with another substituent such as an alkyl group or a halogenated alkyl group; and derivatives thereof. Examples of the derivatives thereof include benzoic acid in which the hydrogen atom of the carboxy group has been substituted with an organic group and may have the hydrogen atom on the α-position substituted with a substituent; and benzoic acid which has a substituent other than a hydroxy group and a carboxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

A "styrene derivative" refers to a compound in which the hydrogen atom on the α-position of styrene is substituted with a substituent such as an alkyl group, a halogenated alkyl group or the like.

A "structural unit derived from styrene" or "structural unit derived from a styrene derivative" refers to a structural unit that is formed by the cleavage of the ethylenic double bond of styrene or a styrene derivative.

As the alkyl group as a substituent on the α-position, a linear or branched alkyl group is preferable, and specific examples include a methyl group, an ethyl group, a propyl group, an isopropyl group, an n-butyl group, an isobutyl group, a tert-butyl group, a pentyl group, an isopentyl group and a neopentyl group.

Specific examples of the halogenated alkyl group as the substituent on the α-position include groups in which part or all of the hydrogen atoms of the aforementioned "alkyl group as the substituent on the α-position" are substituted with halogen atoms. Examples of the halogen atom include a fluorine atom, a chlorine atom, a bromine atom and an iodine atom, and a fluorine atom is particularly desirable.

Specific examples of the hydroxyalkyl group as the substituent on the α-position include groups in which part or all of the hydrogen atoms of the aforementioned "alkyl group as the substituent on the α-position" are substituted with a hydroxy group. The number of hydroxy groups within the hydroxyalkyl group is preferably 1 to 5, and most preferably 1.

The term "exposure" is used as a general concept that includes irradiation with any form of radiation.

According to the present invention, there are provided a block copolymer preferable in the production of a structure suitable for microprocessing, a method of producing a block copolymer, and a method of producing a structure containing a phase-separated structure.

DETAILED DESCRIPTION OF THE INVENTION

<<Block Copolymer>>

Figure 1:
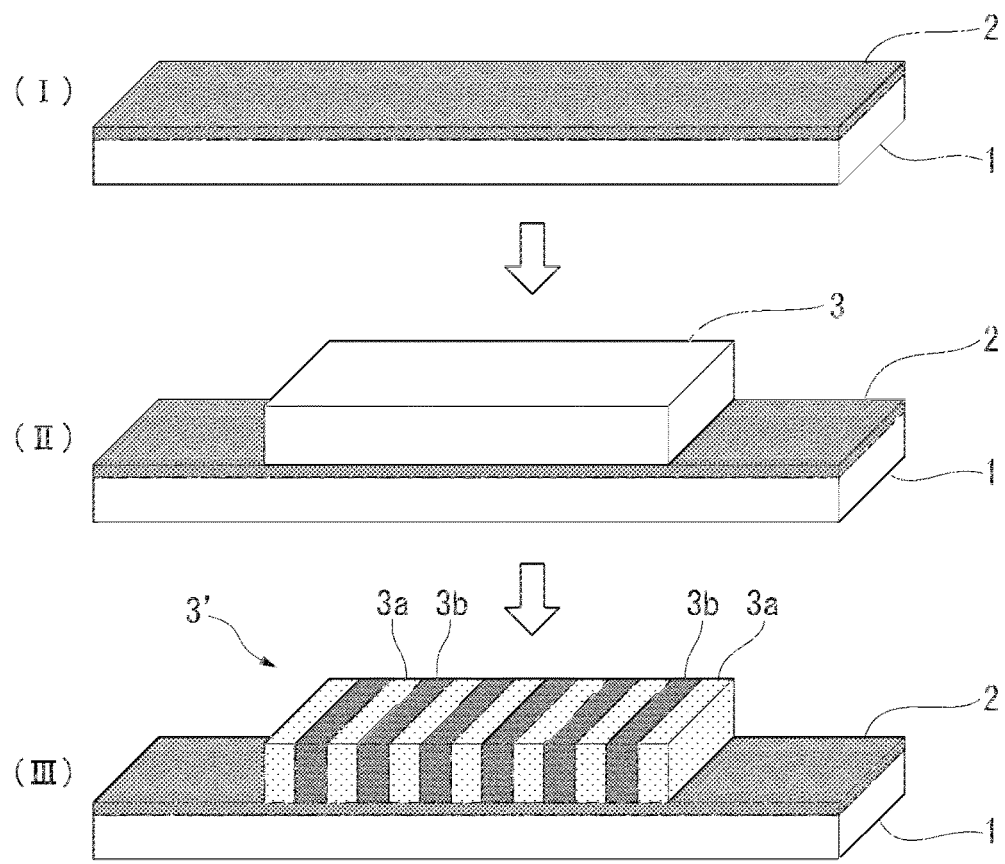
FIG. 1 is a schematic diagram showing an example of one embodiment of the method of forming a structure containing a phase-separated structure according to the present invention.
Figure 2:
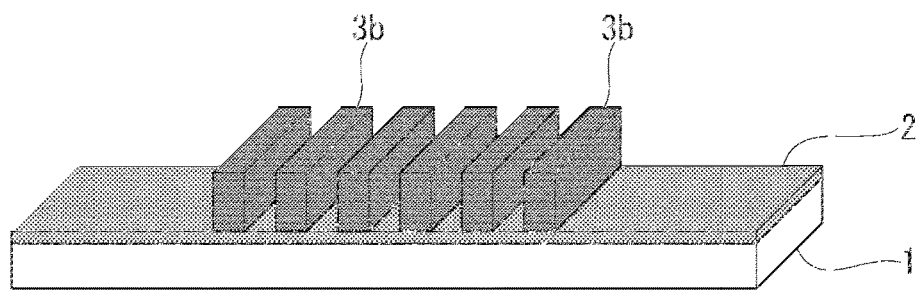
FIG. 2 is an explanatory diagram showing an example of one embodiment of an optional step.

A block copolymer is a polymeric material in which plurality of blocks (partial constitutional components in which the same kind of structural unit is repeatedly bonded) are bonded. As the blocks constituting the block copolymer, 2 kinds of blocks may be used, or 3 or more kinds of blocks may be used.

A first aspect of the present invention is a block copolymer containing a first block having a structure represented by general formula (1). Hereinbelow, the first block will be described.

<First Block>

In the present invention, the first block is represented by general formula (I) shown below.

[Chemical Formula 2]

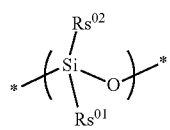

In the formula, at least one of $Rs^{01}$ and $Rs^{02}$ is an organic group having a polar group; $Rs^{01}$ and $Rs^{02}$ may be the same or different from each other; and * represents a valence bond.

[$Rs^{01}$ and $Rs^{02}$]

In general formula (1), $Rs^{01}$ and $Rs^2$ each independently represents an organic group, provided that at least one of $Rs^{01}$ and $Rs^{02}$ has a polar group. $Rs^1$ and $Rs^{02}$ may be the same or different from each other.

Preferable example of the organic group for $Rs^{01}$ and $Rs^{02}$ include a hydrocarbon group. The hydrocarbon group may be an aliphatic hydrocarbon group or an aromatic hydrocarbon group. An "aliphatic hydrocarbon group" refers to a hydrocarbon group that has no aromaticity.

As specific examples of the aliphatic hydrocarbon group, a linear, branched or cyclic aliphatic hydrocarbon group, and an aliphatic hydrocarbon group containing a ring in the structure thereof may be given.

As the linear aliphatic hydrocarbon group, an alkyl group is preferable. The alkyl group preferably has 1 to 20 carbon atoms, more preferably 1 to 10 carbon atoms, still more preferably 1 to 8 carbon atoms, still more preferably 1 to 6 carbon atoms, and most preferably 1 to 4 carbon atoms.

The alkyl group may be a partially or completely halogenated alkyl group (hereinafter, sometimes referred to as a "halogenated alkyl group").

Specific examples include a methyl group, an ethyl group, a propyl group and a butyl group.

As the branched aliphatic hydrocarbon group, an alkenyl group is preferable. Examples of the alkenyl group include a vinyl group, an allyl group, a butenyl group, a pentenyl group, a hexenyl group, and a heptenyl group.

The cyclic aliphatic hydrocarbon group preferably has 3 to 20 carbon atoms, and more preferably 3 to 12 carbon atoms.

The alicyclic hydrocarbon group may be either a monocyclic group or a polycyclic group. As the monocyclic aliphatic hydrocarbon group, a group in which 1 hydrogen atom has been removed from a monocycloalkane is preferable. The monocycloalkane preferably has 3 to 6 carbon atoms, and specific examples thereof include cyclopentane and cyclohexane. As the polycyclic group, a group in which two hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

As examples of the hydrocarbon group containing a ring, a cyclic aliphatic hydrocarbon group containing a hetero atom in the ring structure thereof and may have a substituent (a group in which one hydrogen atom has been removed from an aliphatic hydrocarbon ring), a group in which the cyclic aliphatic hydrocarbon group is bonded to the terminal of the aforementioned chain-like aliphatic hydrocarbon group, and a group in which the cyclic aliphatic group is interposed within the aforementioned linear or branched aliphatic hydrocarbon group, can be given.

The aromatic hydrocarbon group is a hydrocarbon group having an aromatic ring.

Examples of the aromatic ring contained in the aromatic hydrocarbon group include aromatic hydrocarbon rings, such as benzene, biphenyl, fluorene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom.

Specific examples of the aromatic hydrocarbon group include a group in which one hydrogen atom has been removed from the aforementioned aromatic hydrocarbon ring (aryl group) and one hydrogen atom has been substituted with an alkylene group (such as a benzyl group, a phenethyl group, a 1-naphthylmethyl group, a 2-naphthylmethyl group, a 1-naphthylethyl group, or a 2-naphthylethyl group). The alkylene group (alkyl chain within the arylalkyl group) preferably has 1 to 4 carbon atom, more preferably 1 or 2, and most preferably 1.

Examples of the polar group contained in the organic group for $Rs^{01}$ and $Rs^{02}$ include a group represented by any one of formulae ($Rs^{01}$-1) to ($Rs^{01}$-11) shown below.

In the present invention, the first block having a structure represented by general formula (I) preferably has at least one functional group selected from the group consisting of formulae ($Rs^{01}$-1) to ($Rs^{01}$-11) shown below.

[Chemical Formula 3]

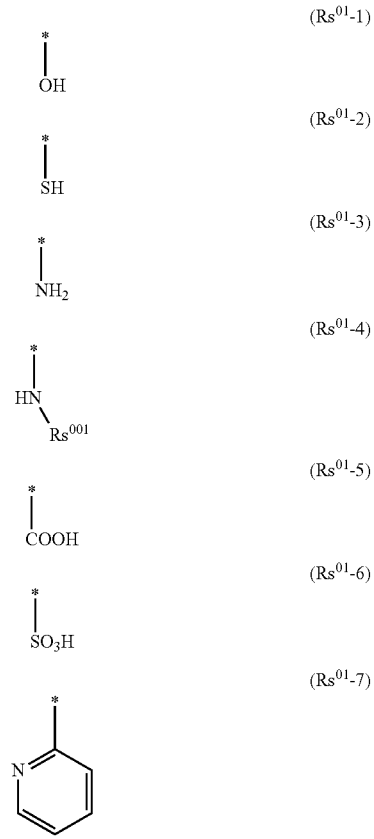

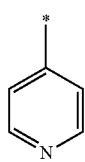
(Rs$^{01}$-8)

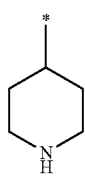
(Rs$^{01}$-9)

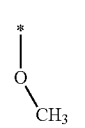
(Rs$^{01}$-10)

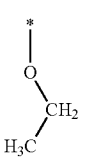
(Rs$^{01}$-11)

In general formula (1), at least one of Rs$^{01}$ and Rs$^{02}$ is an organic group having a polar group; Rs$^{01}$ and Rs$^{02}$ may be the same or different from each other;

In the present invention, the structure represented by the aforementioned general formula (1) is preferably a structure represented by general formula (1-1) shown below.

[Chemical Formula 4]

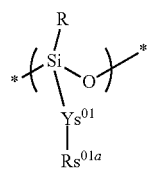
(1-1)

In the formula, R represents a hydrogen atom, an alkyl group of 1 to 5 carbon atoms or a halogenated alkyl group of 1 to 5 carbon atoms; Ys$^{01}$ represents a divalent linking group; Rs$^{01a}$ represents an organic group having a polar group; and * represents a valence bond.

In general formula (1-1), Rs$^{01a}$ is the same as defined for the aforementioned Rs$^{01}$.

The divalent linking group for Ys$^{01}$ is not particularly limited, and preferable examples thereof include a divalent hydrocarbon group which may have a substituent and a divalent linking group containing a hetero atom.

Further, in the present invention, from the viewpoint of improving the operability during synthesis and reducing metals, as the divalent linking group for Ys$^{01}$, a divalent linking group containing a hetero atom is preferable, and a group containing a sulfur atom or a silicon atom is preferable.

(Divalent Hydrocarbon Group which May have a Substituent)

The hydrocarbon group as a divalent linking group may be either an aliphatic hydrocarbon group or an aromatic hydrocarbon group.

An "aliphatic hydrocarbon group" refers to a hydrocarbon group that has no aromaticity. The aliphatic hydrocarbon group may be saturated or unsaturated. In general, the aliphatic hydrocarbon group is preferably saturated.

Examples of the aliphatic hydrocarbon group include a linear or branched aliphatic hydrocarbon group, and an aliphatic hydrocarbon group containing a ring in the structure thereof. Specifically, groups in which 2 hydrogen atoms have been removed from those mentioned above as examples of Rs$^{01}$ may be mentioned.

The linear or branched aliphatic hydrocarbon group may or may not have a substituent. Examples of the substituent include a fluorine atom, a fluorinated alkyl group of 1 to 5 carbon atoms, and a carbonyl group.

As examples of the hydrocarbon group containing a ring in the structure thereof, a cyclic aliphatic hydrocarbon group containing a hetero atom in the ring structure thereof and may have a substituent (a group in which two hydrogen atoms have been removed from an aliphatic hydrocarbon ring), a group in which the cyclic aliphatic hydrocarbon group is bonded to the terminal of the aforementioned chain-like aliphatic hydrocarbon group, and a group in which the cyclic aliphatic group is interposed within the aforementioned linear or branched aliphatic hydrocarbon group, can be given. As the linear or branched aliphatic hydrocarbon group, the same groups as those described above can be used.

The cyclic aliphatic hydrocarbon group preferably has 3 to 20 carbon atoms, and more preferably 3 to 12 carbon atoms.

Specific examples of the cyclic aliphatic hydrocarbon group include groups in which 2 hydrogen atoms have been removed from the cyclic aliphatic hydrocarbon groups mentioned above as examples of Rs$^{01}$.

The cyclic aliphatic hydrocarbon group may or may not have a substituent. Examples of the substituent include an alkyl group, an alkoxy group, a halogen atom, a halogenated alkyl group, a hydroxyl group and a carbonyl group.

The alkyl group as the substituent is preferably an alkyl group of 1 to 5 carbon atoms, and a methyl group, an ethyl group, a propyl group, an n-butyl group or a tert-butyl group is particularly desirable.

The alkoxy group as the substituent is preferably an alkoxy group having 1 to 5 carbon atoms, more preferably a methoxy group, ethoxy group, n-propoxy group, isopropoxy group, n-butoxy group or tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Examples of the halogenated alkyl group for the substituent include groups in which part or all of the hydrogen atoms within the aforementioned alkyl groups has been substituted with the aforementioned halogen atoms.

Further, the substituent may be at least one functional group selected from the group consisting of the aforementioned formulae (Rs$^{01}$-1) to (Rs$^{01}$-11).

The cyclic aliphatic hydrocarbon group may have part of the carbon atoms constituting the ring structure thereof substituted with a substituent containing a hetero atom. As the substituent containing a hetero atom, —O—, —C(=O)—O—, —S—, —S(=O)$_2$— or —S(=O)$_2$—O— is preferable.

Specific examples of the aromatic hydrocarbon group as the divalent linking group include groups in which 2 hydrogen atoms have been removed from aromatic hydrocarbon groups mentioned above as examples of Rs$^{01}$.

With respect to the aromatic hydrocarbon group, the hydrogen atom within the aromatic hydrocarbon group may be substituted with a substituent. For example, the hydrogen atom bonded to the aromatic ring within the aromatic hydrocarbon group may be substituted with a substituent. Examples of substituents include an alkyl group, an alkoxy group, a halogen atom, a halogenated alkyl group, and a hydroxyl group.

The alkyl group as the substituent is preferably an alkyl group of 1 to 5 carbon atoms, and a methyl group, an ethyl group, a propyl group, an n-butyl group or a tert-butyl group is particularly desirable.

As the alkoxy group, the halogen atom and the halogenated alkyl group for the substituent, the same groups as the aforementioned substituent groups for substituting a hydrogen atom within the cyclic aliphatic hydrocarbon group can be used.

(Divalent Linking Group Containing a Hetero Atom)

With respect to a divalent linking group containing a hetero atom, a hetero atom is an atom other than carbon and hydrogen, and examples thereof include an oxygen atom, a nitrogen atom, a sulfur atom, a silicon atom and a halogen atom.

Among these examples, from the viewpoint of improving the operability during synthesis and reducing metals, as the divalent linking group for $Ys^{01}$, a group containing a sulfur atom or a silicon atom is preferable.

In the case where $Ya^{01}$ represents a divalent linking group containing a hetero atom, preferable examples of the linking group include —O—, —C(=O)—O—, —C(=O)—, —O—C(=O)—O—, —C(=O)—NH—, —NH—, —NH—C(=NH)— (wherein H may be substituted with a substituent such as an alkyl group or an acyl group), —S—, —S(=O)$_2$—, —S(=O)$_2$—O—, Si, a group represented by general formula —$Y^{21}$—O—$Y^{22}$—, —$Y^{21}$—O—, —$Y^{21}$—C(=O)—O—, —C(=O)—O—$Y^{21}$, —[$Y^{21}$—C(=O)]$_{m'}$—$Y^{22}$— or —$Y^{21}$—O—C(=O)—$Y^{22}$— [in the formulae, $Y^{21}$ and $Y^{22}$ each independently represents a divalent hydrocarbon group which may have a substituent, and O represents an oxygen atom; and m' represents an integer of 0 to 3.

The divalent linking group containing a hetero atom represents —C(=O)—NH—, —NH—, or —NH—C(=NH)—, H may be substituted with a substituent such as an alkyl group, an acyl group or the like. The substituent (an alkyl group, an acyl group or the like) preferably has 1 to 10 carbon atoms, more preferably 1 to 8, and most preferably 1 to 5.

In formulae —$Y^{21}$—O—$Y^{22}$—, —$Y^{21}$—O—, —$Y^{21}$—C(=O)—O—, —C(=O)—O—$Y^{21}$, —[$Y^{21}$—C(=O)—O]$_{m'}$—$Y^{22}$— and —$Y^{21}$—O—C(=O)—$Y^{22}$—, $Y^{21}$ and $Y^{22}$ each independently represents a divalent hydrocarbon group which may have a substituent. Examples of the divalent hydrocarbon group include the same groups as those described above as the "divalent hydrocarbon group which may have a substituent" in the explanation of the aforementioned divalent linking group.

As $Y^{21}$, a linear aliphatic hydrocarbon group is preferable, more preferably a linear alkylene group, still more preferably a linear alkylene group of 1 to 5 carbon atoms, and a methylene group or an ethylene group is particularly desirable.

As $Y^{22}$, a linear or branched aliphatic hydrocarbon group is preferable, and a methylene group, an ethylene group or an alkylmethylene group is more preferable. The alkyl group within the alkylmethylene group is preferably a linear alkyl group of 1 to 5 carbon atoms, more preferably a linear alkyl group of 1 to 3 carbon atoms, and most preferably a methyl group.

In the group represented by the formula —[$Y^{21}$—C(=O)—O]$_{m'}$—$Y^{22}$—, m' represents an integer of 0 to 3, preferably an integer of 0 to 2, more preferably 0 or 1, and most preferably 1. Namely, it is particularly desirable that the group represented by the formula —[$Y^{21}$—C(=O)—O]$_{m'}$—$Y^{22}$— is a group represented by the formula —$Y^{21}$—C(=O)—O—$Y^{22}$—. Among these, a group represented by the formula —(CH$_2$)$_{a'}$—C(=O)—O—(CH$_2$)$_{b'}$— in preferable. In the formula, a' is an integer of 1 to 10, preferably an integer of 1 to 8, more preferably an integer of 1 to 5, still more preferably 1 or 2, and most preferably 1. b' is an integer of 1 to 10, preferably an integer of 1 to 8, more preferably an integer of 1 to 5, still more preferably 1 or 2, and most preferably 1.

In the present invention, as $Ys^{01}$, a linear or branched alkylene group substituted with a sulfur atom or a silicon atom is preferable.

The structure represented by the aforementioned general formula (1-1) is preferably a structure represented by general formula (1-1-1) or (1-1-2) shown below.

[Chemical Formula 5]

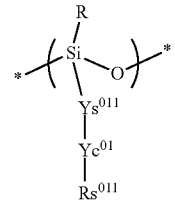

(1-1-1)

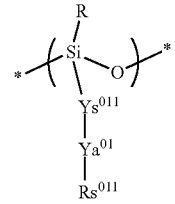

(1-1-2)

In the formula, R represents a hydrogen atom, an alkyl group of 1 to 5 carbon atoms or a halogenated alkyl group of 1 to 5 carbon atoms; $Ys^{011}$ represents a divalent linking group which may contain a sulfur atom or a silicon atom; $Yc^{01}$ represents a divalent cyclic group; $Ya^{01}$ represents a linear or branched alkylene group; $Rs^{011}$ represents a functional group selected from the group consisting of the aforementioned formulae ($Rs^{01}$-1) to ($Rs^{m}$-11); and * represents a valence bond.

In general formulae (1-1-1) and (1-1-2), R is the same as defined above.

$Ys^{011}$ represents a divalent linking group which may contain a sulfur atom or a silicon atom. The divalent linking group may or may not contain a sulfur atom or a silicon atom. In the present invention, in terms of ease in production, a linking group containing a sulfur atom or a silicon atom is preferable, and a linking group containing a sulfur atom is more preferable.

As the linking group containing a sulfur atom or a silicon atom, a linear or branched alkylene group of 1 to 10 carbon atoms containing a sulfur atom or a silicon atom is preferable.

Yc$^{o1}$ represents a divalent cyclic group. Examples of the divalent cyclic group include a group in which 2 hydrogen atoms have been removed from a monocycloalkane, and a group in which 2 hydrogen atoms have been removed from an aromatic hydrocarbon ring such as benzene, biphenyl, fluorene, naphthalene, anthracene or phenanthrene (aryl group).

The monocycloalkane preferably has 3 to 6 carbon atoms, and specific examples thereof include cyclopentane and cyclohexane. As the polycyclic group, a group in which two hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

Ya$^{o1}$ represents a linear or branched alkylene group, and is preferably a linear or branched alkylene group of 1 to 10 carbon atoms. Among these examples, as Ya$^{o1}$, a linear alkylene group is preferable, and specific examples thereof include a methylene group [—CH$_2$—], an ethylene group [—(CH$_2$)$_2$—], a trimethylene group [—(CH$_2$)$_3$—], a tetramethylene group [—(CH$_2$)$_4$—] and a pentamethylene group [—(CH$_2$)$_5$—]. Among these examples, a methylene group [—CH$_2$—], an ethylene group [—(CH$_2$)$_2$—] or a trimethylene group [—(CH$_2$)$_3$—] is preferable, and an ethylene group [—(CH$_2$)$_2$—] or a trimethylene group [—(CH$_2$)$_3$—] is more preferable.

Rs$^{o11}$ represents a functional group selected from the group consisting of the aforementioned formulae (Rs$^{o1}$-1) to (Rs$^1$-11).

Specific examples of the structure represented by general formula (1-1-1) are shown below.

[Chemical Formula 6]

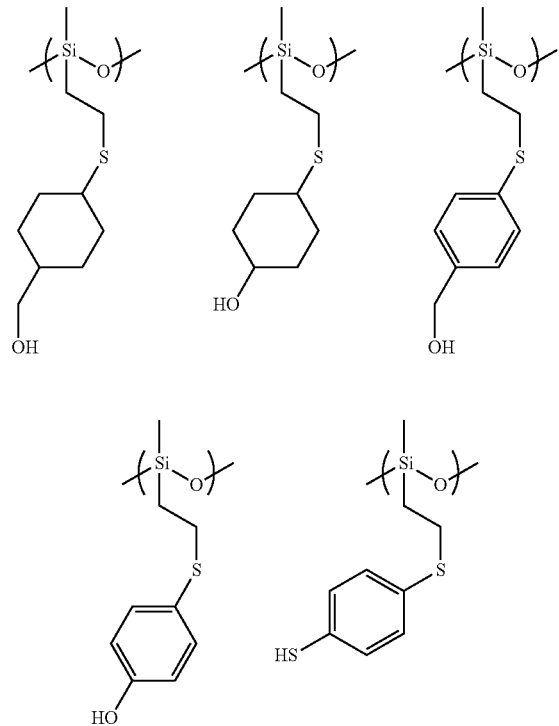

[Chemical Formula 7]

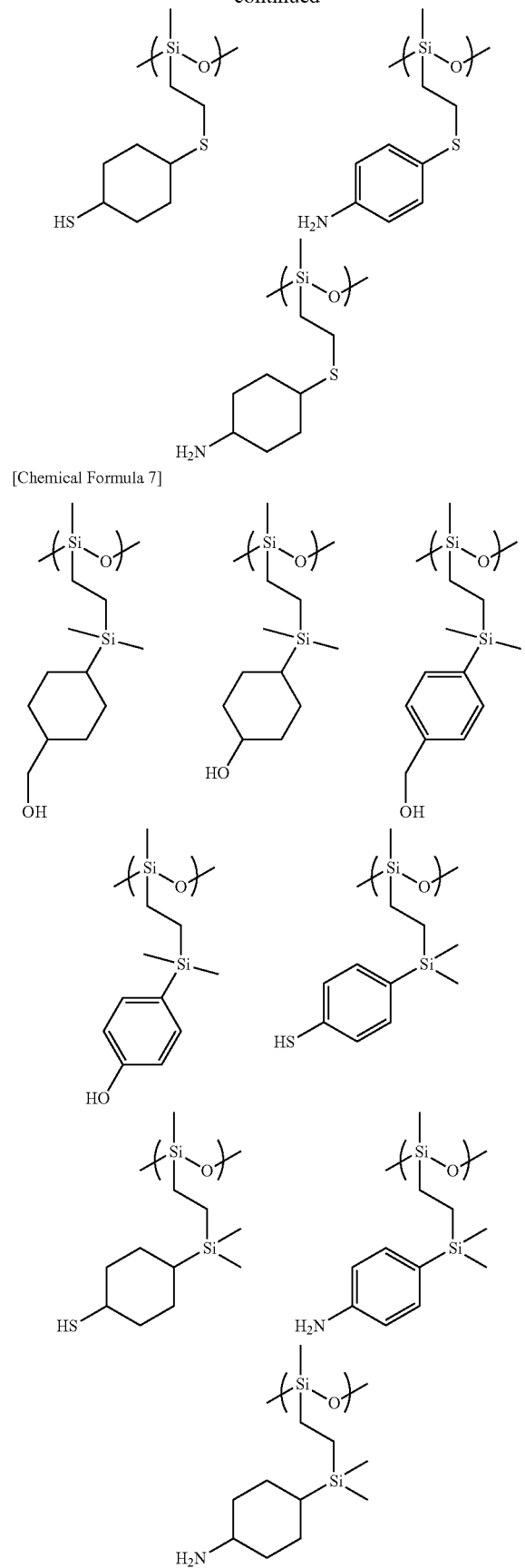

[Chemical Formula 8]
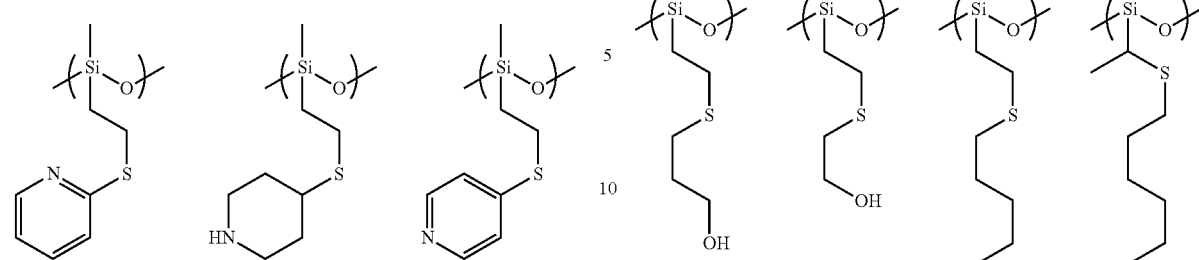
[Chemical Formula 9]
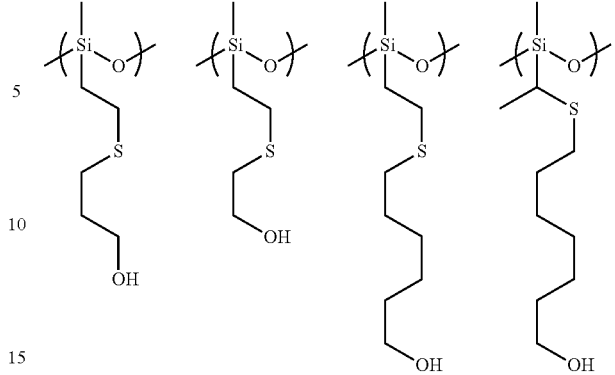
Specific examples of the structure represented by general formula (1-1-2) are shown below.
[Chemical Formula 10]
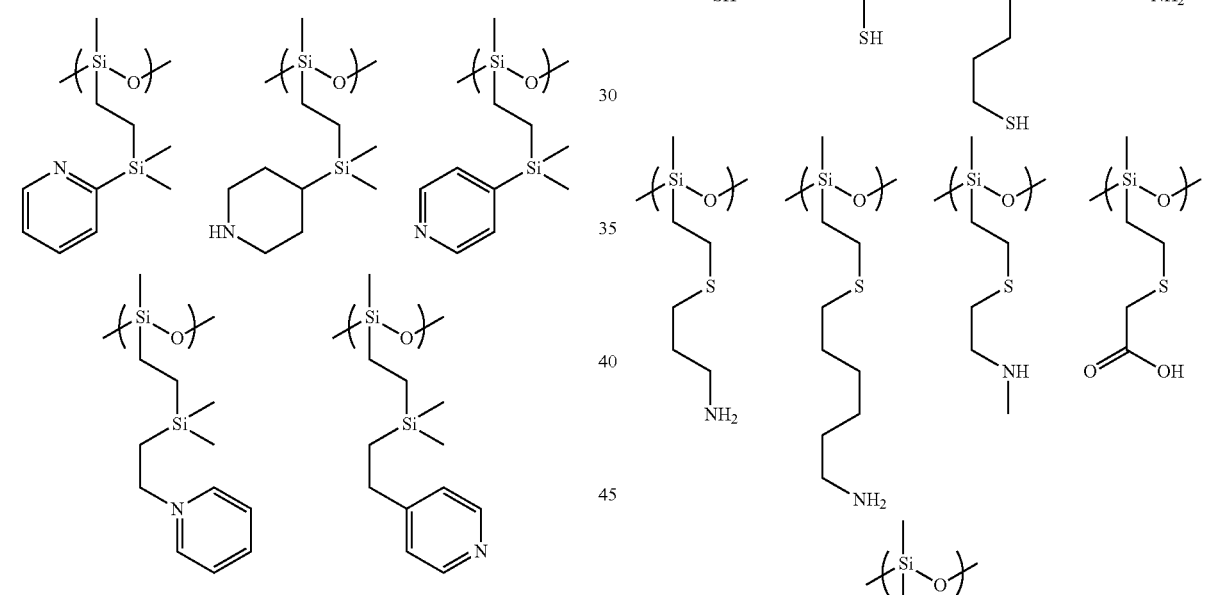
[Chemical Formula 11]
[Chemical Formula 12]
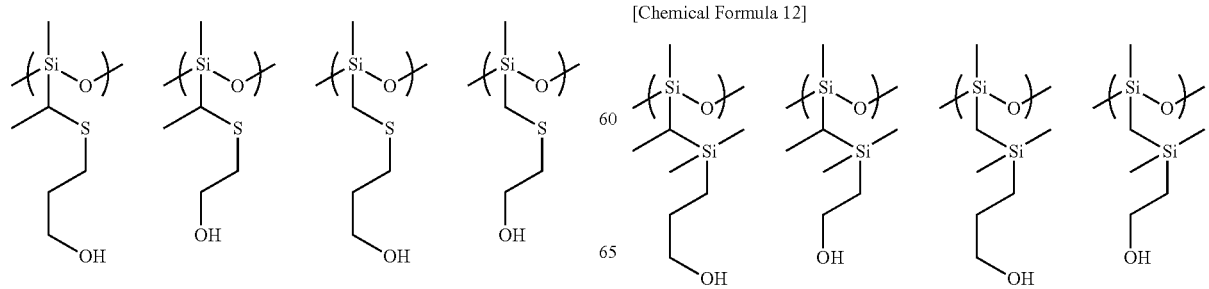

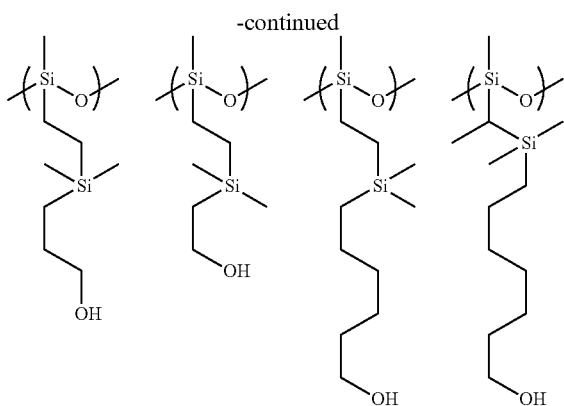

[Chemical Formula 13]

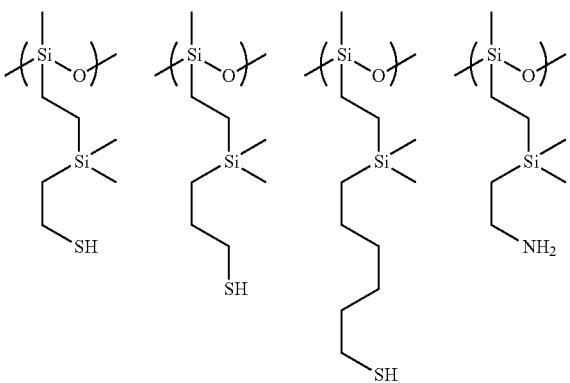

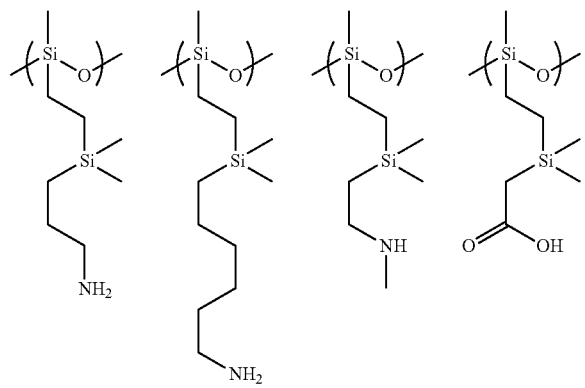

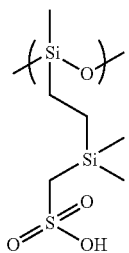

<Second Block>

The block copolymer of the present invention preferably contains a second block capable of causing phase separation with the first block.

Examples of the second block include a block of a structural unit having an aromatic group, a block of a structural unit derived from an (α-substituted) acrylic acid, a block of an (α-substituted) acrylate ester, a block of a structural unit derived from siloxane or a derivative thereof, a block of a structural unit derived from an alkyleneoxide, a block of a structural unit containing a polyhedral oligomeric silsesquioxane (POSS) structure, and a block of a structural unit derived from siloxane or a derivative thereof.

Examples of the structural unit having an aromatic group include structural units having a phenyl group, a naphthyl group or the like. In the present embodiment, a structural unit derived from styrene or a derivative thereof is preferable.

Examples of the styrene derivative include α-methylstyrene, 2-methylstyrene, 3-methyl styrene, 4-methyl styrene, 4-t-butyl styrene, 4-n-octylstyrene, 2,4,6-trimethylstyrene, 4-methoxystyrene, 4-t-butoxystyrene, 4-hydroxystyrene, 4-nitrostyrene, 3-nitrostyrene, 4-chlorostyrene, 4-fluorostyrene, 4-acetoxyvinylstyrene, 4-vinylbenzylchloride, 1-vinylnaphthalene, 4-vinylbiphenyl, 1-vinyl-2-pyrolidone, 9-vinylanthracene, and vinylpyridine.

An (α-substituted) acrylic acid refers to either or both acrylic acid and a compound in which the hydrogen atom bonded to the carbon atom on the α-position of acrylic acid has been substituted with a substituent. As an example of such a substituent, an alkyl group of 1 to 5 carbon atoms can be given.

Examples of (α-substituted) acrylic acid include acrylic acid and methacrylic acid.

An (α-substituted) acrylate ester refers to either or both acrylate ester and a compound in which the hydrogen atom bonded to the carbon atom on the α-position of acrylate ester has been substituted with a substituent. As an example of such a substituent, an alkyl group of 1 to 5 carbon atoms can be given.

Specific examples of the (α-substituted) acrylate ester include acrylate esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate; and methacrylate esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxycyclohexylmethane methacrylate, and propyltrimethoxysilane methacrylate.

Among these, methyl acrylate, ethyl acrylate, t-butyl acrylate, methyl methacrylate, ethyl methacrylate, and t-butyl methacrylate are preferable.

Examples of siloxane or derivative thereof include dimethylsiloxane, diethylsiloxane, diphenylsiloxane, and methylphenylsiloxane.

Examples of the alkylene oxide include ethylene oxide, propylene oxide, isopropylene oxide and butylene oxide.

Specific examples of the structural unit containing a polyhedral oligomeric silsesquioxane structure include a structural unit represented by general formula (a0-1) shown below.

[Chemical Formula 14]

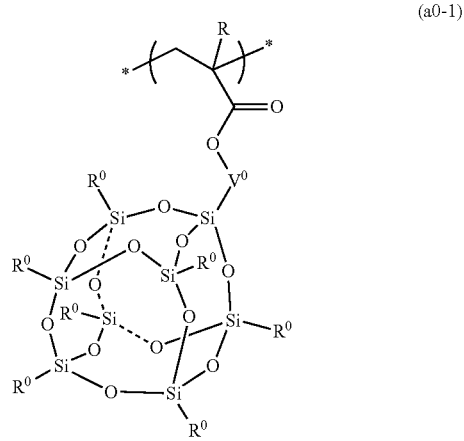

(a0-1)

In the formula, R represents a hydrogen atom, an alkyl group of 1 to 5 carbon atoms or a halogenated alkyl group of 1 to 5 carbon atoms; $V^0$ represents a divalent hydrocarbon group which may have a substituent; and $R^0$ represents a monovalent hydrocarbon group which may have a substituent, wherein the plurality of $R^0$ may be the same or different from each other. and * represents a valence bond.

In the aforementioned formula (a0-1), as the alkyl group of 1 to 5 carbon atoms for R, a linear or branched alkyl group of 1 to 5 carbon atoms is preferable, and specific examples thereof include a methyl group, an ethyl group, a propyl group, an isopropyl group, an n-butyl group, an isobutyl group, a tert-butyl group, a pentyl group, an isopentyl group and a neopentyl group. The halogenated alkyl group of 1 to 5 carbon atoms represented by R is a group in which part or all of the hydrogen atoms of the aforementioned alkyl group of 1 to 5 carbon atoms have been substituted with halogen atoms. Examples of the halogen atom include a fluorine atom, a chlorine atom, a bromine atom and an iodine atom, and a fluorine atom is particularly desirable.

As R, a hydrogen atom, an alkyl group of 1 to 5 carbon atoms or a fluorinated alkyl group of 1 to 5 carbon atoms is preferable, and a hydrogen atom or a methyl group is particularly desirable in terms of industrial availability.

In formula (a0-1), the monovalent hydrocarbon group for $R^0$ preferably contains 1 to 20 carbon atoms, more preferably 1 to 10 carbon atoms, and still more preferably 1 to 8 carbon atoms. However, this number of carbon atoms does not include any carbon atoms within any of the substituents described below.

The monovalent hydrocarbon group for $R^0$ may be an aliphatic hydrocarbon group or an aromatic hydrocarbon group, but is preferably an aliphatic hydrocarbon group, and more preferably a monovalent aliphatic saturated hydrocarbon group (alkyl group).

More specific examples of this alkyl group include chain-like aliphatic hydrocarbon groups (linear or branched alkyl groups), and aliphatic hydrocarbon groups that include a ring within the structure.

The linear alkyl group preferably contains 1 to 8 carbon atoms, more preferably 1 to 5 carbon atoms, and still more preferably 1 to 3 carbon atoms. Specific examples include a methyl group, an ethyl group, an n-propyl group, an isopropyl group, an n-butyl group, an isobutyl group and an n-pentyl group. Among these, a methyl group, an ethyl group or an n-propyl group is preferable, a methyl group, an ethyl group or an isobutyl group is more preferable, and an ethyl group is most preferable.

The branched alkyl group preferably has 3 to 5 carbon atoms. Specific examples of such branched alkyl groups include an isopropyl group, an isobutyl group, a tert-butyl group, an isopentyl group and a neopentyl group, and an isopropyl group or a tert-butyl group is particularly desirable.

As examples of the hydrocarbon group containing a ring in the structure thereof, a cyclic aliphatic hydrocarbon group (a group in which 1 hydrogen atom has been removed from an aliphatic hydrocarbon ring), a group in which the cyclic aliphatic hydrocarbon group is bonded to the terminal of the aforementioned chain-like aliphatic hydrocarbon group, and a group in which the cyclic aliphatic hydrocarbon group is interposed within the aforementioned chain-like aliphatic hydrocarbon group, can be given.

The cyclic aliphatic hydrocarbon group preferably has 3 to 8 carbon atoms, and more preferably 4 to 6 carbon atoms. The cyclic aliphatic hydrocarbon group may be either a polycyclic group, or a monocyclic group. As the monocyclic group, a group in which 1 or more hydrogen atoms have been removed from a monocycloalkane of 3 to 6 carbon atoms is preferable. Examples of the monocycloalkane include cyclopentane and cyclohexane. As the polycyclic group, a group in which 1 or more hydrogen atom has been removed from a polycycloalkane of 7 to 12 carbon atoms is preferable. Examples of the polycycloalkane include adamantane, norbornane, isobornane, tricyclodecane and tetracyclododecane.

The chain-like aliphatic hydrocarbon group may have a substituent. Examples of the substituent include a fluorine atom, a fluorinated alkyl group of 1 to 5 carbon atoms, and an oxygen atom (=O).

The cyclic aliphatic hydrocarbon group may have a substituent. Examples of the substituent include an alkyl group of 1 to 5 carbon atoms, a fluorine atom, a fluorinated alkyl group of 1 to 5 carbon atoms, and an oxygen atom (=O).

In the case where the monovalent hydrocarbon group for $R^0$ is an aromatic hydrocarbon group, the aromatic hydrocarbon group is a monovalent hydrocarbon group having at least 1 aromatic ring.

The aromatic ring is not particularly limited, as long as it is a cyclic conjugated compound having $(4n+2)$ π electrons, and may be either monocyclic or polycyclic. The aromatic ring preferably has 5 to 30 carbon atoms, more preferably 5 to 20, still more preferably 6 to 15, and most preferably 6 to 12. However, this number of carbon atoms does not include any carbon atoms within any of the substituents described below.

Examples of the aromatic ring include aromatic hydrocarbon rings, such as benzene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom. Specific examples of the aromatic hetero ring include a pyridine ring and a thiophene ring.

Specific examples of the aromatic hydrocarbon group include a group in which one hydrogen atom has been removed from the aforementioned aromatic hydrocarbon ring or aromatic hetero ring (aryl group or heteroaryl group); a group in which one hydrogen atom has been removed from an aromatic compound having two or more aromatic rings (biphenyl, fluorene or the like); and a group in which one hydrogen atom of the aforementioned aromatic hydrocarbon ring or aromatic hetero ring has been substituted with an alkylene group (an arylalkyl group such as a benzyl group, a phenethyl group, a 1-naphthylmethyl group, a 2-naphthylmethyl group, a 1-naphthylethyl group, or a 2-naphthylethyl group).

The alkylene group which is bonded to the aforementioned aryl group or heteroaryl group preferably has 1 to 4 carbon atoms, more preferably 1 or 2 carbon atoms, and most preferably 1 carbon atom.

The aromatic hydrocarbon group may or may not have a substituent. Examples of the substituent include an alkyl group of 1 to 5 carbon atoms, a fluorine atom, a fluorinated alkyl group of 1 to 5 carbon atoms, and an oxygen atom (=O).

In formula (a0-1), the divalent hydrocarbon group for $V^0$ may be either an aliphatic hydrocarbon group or an aromatic hydrocarbon group. An "aliphatic hydrocarbon group" refers to a hydrocarbon group that has no aromaticity.

The aliphatic hydrocarbon group as the divalent hydrocarbon group for $V^0$ may be either saturated or unsaturated. In general, the aliphatic hydrocarbon group is preferably saturated.

As specific examples of the aliphatic hydrocarbon group, a linear or branched aliphatic hydrocarbon group, and an aliphatic hydrocarbon group containing a ring in the structure thereof can be given.

The linear or branched aliphatic hydrocarbon group preferably has 1 to 10 carbon atoms, more preferably 1 to 6, still more preferably 1 to 4, and most preferably 1 to 3.

As the linear aliphatic hydrocarbon group, a linear alkylene group is preferable. Specific examples thereof include a methylene group [—$CH_2$—], an ethylene group [—$(CH_2)_2$—], a trimethylene group [—$(CH_2)_3$—], a tetramethylene group [—$(CH_2)_4$—] and a pentamethylene group [—$(CH_2)_5$—].

As the branched aliphatic hydrocarbon group, branched alkylene groups are preferred, and specific examples include various alkylalkylene groups, including alkylmethylene groups such as —$CH(CH_3)$—, —$CH(CH_2CH_3)$—, —$C(CH_3)_2$—, —$C(CH_3)(CH_2CH_3)$—, —$C(CH_3)(CH_2CH_2CH_3)$—, and —$C(CH_2CH_3)_2$—; alkylethylene groups such as —$CH(CH_3)CH_2$—, —$CH(CH_3)CH(CH_3)$—, —$C(CH_3)_2CH_2$—, —$CH(CH_2CH_3)CH_2$—, and —$C(CH_2CH_3)_2$—$CH_2$—; alkyltrimethylene groups such as —$CH(CH_3)CH_2CH_2$—, and —$CH_2CH(CH_3)CH_2$—; and alkyltetramethylene groups such as —$CH(CH_3)CH_2CH_2CH_2$—, and —$CH_2CH(CH_3)CH_2CH_2$—. As the alkyl group within the alkylalkylene group, a linear alkyl group of 1 to 5 carbon atoms is preferable.

As examples of the hydrocarbon group containing a ring in the structure thereof, an alicyclic hydrocarbon group (a group in which two hydrogen atoms have been removed from an aliphatic hydrocarbon ring), a group in which the alicyclic hydrocarbon group is bonded to the terminal of the aforementioned chain-like aliphatic hydrocarbon group, and a group in which the alicyclic group is interposed within the aforementioned linear or branched aliphatic hydrocarbon group, can be given. As the linear or branched aliphatic hydrocarbon group, the same groups as those described above can be used.

The alicyclic hydrocarbon group preferably has 3 to 20 carbon atoms, and more preferably 3 to 12 carbon atoms.

The alicyclic hydrocarbon group may be either a polycyclic group or a monocyclic group. As the monocyclic aliphatic hydrocarbon group, a group in which 2 hydrogen atoms have been removed from a monocycloalkane is preferable. The monocycloalkane preferably has 3 to 6 carbon atoms, and specific examples thereof include cyclopentane and cyclohexane.

As the polycyclic group, a group in which 2 hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

The aromatic hydrocarbon group is a hydrocarbon group having an aromatic ring.

The aromatic ring is not particularly limited, as long as it is a cyclic conjugated compound having (4n+2) π electrons, and may be either monocyclic or polycyclic. The aromatic ring preferably has 5 to 30 carbon atoms, more preferably 5 to 20, still more preferably 6 to 15, and most preferably 6 to 12. However, this number of carbon atoms does not include any carbon atoms within any of the substituents described below.

Examples of the aromatic ring include aromatic hydrocarbon rings, such as benzene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom. Specific examples of the aromatic hetero ring include a pyridine ring and a thiophene ring.

Specific examples of the aromatic hydrocarbon group include a group in which two hydrogen atoms have been removed from the aforementioned aromatic hydrocarbon ring or aromatic hetero ring (arylene group or heteroarylene group); a group in which two hydrogen atoms have been removed from an aromatic compound having two or more aromatic rings (biphenyl, fluorene or the like); and a group in which one hydrogen atom of the aforementioned aromatic hydrocarbon ring or aromatic hetero ring has been substituted with an alkylene group (a group in which one hydrogen atom has been removed from the aryl group within the aforementioned arylalkyl group such as a benzyl group, a phenethyl group, a 1-naphthylmethyl group, a 2-naphthylmethyl group, a 1-naphthylethyl group, or a 2-naphthylethyl group, or a heteroarylalkyl group).

The alkylene group which is bonded to the aforementioned aryl group or heteroaryl group preferably has 1 to 4 carbon atoms, more preferably 1 or 2 carbon atoms, and most preferably 1 carbon atom.

Specific examples of structural unit represented by formula (a0-1) are shown below. In the formulae shown below, $R^\alpha$ represents a hydrogen atom, a methyl group or a trifluoromethyl group.

[Chemical Formula 15]

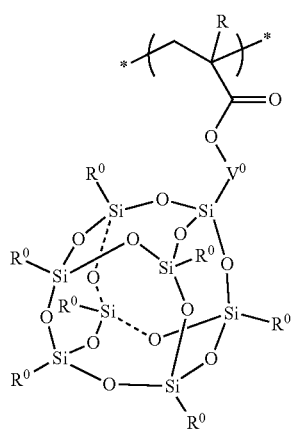

R⁰ = an ethyl group or an isobutyl group

Among these examples, as the second block, a block in which structural units derived from styrene or a styrene derivative are repeatedly bonded; a block in which structural units derived from an acrylate ester which may have the hydrogen atom bonded to the carbon atom on the α-position substituted with a substituent (structural units derived from (α-substituted) acrylate ester) are repeatedly bonded; a block in which structural units derived from acrylic acid which may have the hydrogen atom bonded to the carbon atom on the α-position substituted with a substituent (structural units derived from (α-substituted) acrylic acid) are repeatedly bonded; a block in which structural units derived from siloxane or a derivative thereof are repeatedly bonded; a block in which structural units derived from an alkylene-oxide are repeatedly bonded; or a block in which silsesquioxane structure-containing structural units are repeatedly bonded is preferable.

Specific examples of the structural unit which constitutes the second block are shown below.

[Chemcical Formula 16]

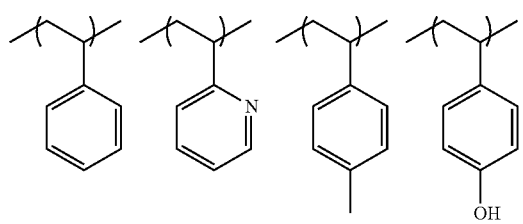

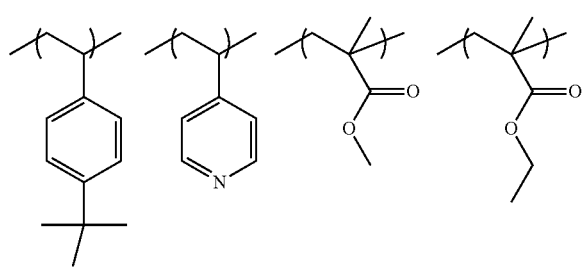

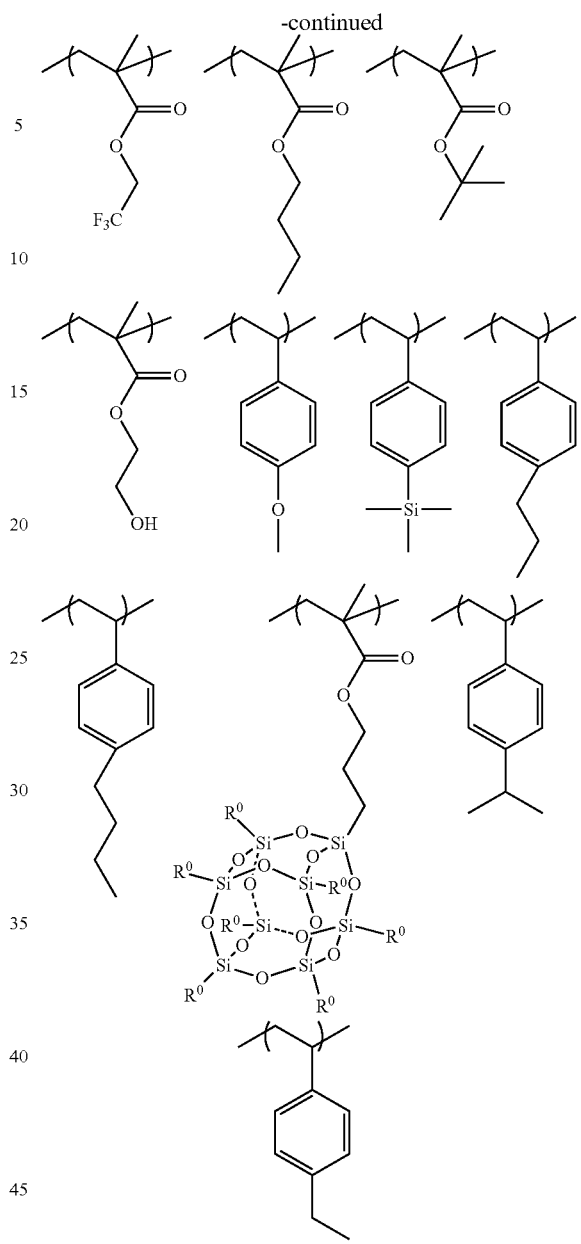

In the present invention, the weight ratio of the first block to the second block is preferably 15:85 to 85:15.

When the ratio of the first block to the second block is in the above preferable range, a periodic structure suitable for a fine pattern can be reliably obtained.

The number average molecular weight (Mn) (the polystyrene equivalent value determined by gel permeation chromatography) of the block copolymer is preferably 4,000 or more. In the present invention, the number average molecular weight (Mn) is more preferably 5,000 or more, and still more preferably 8,000 or more.

Further, the number average molecular weight is preferably 2,000,000 or less.

The polydispersity (Mw/Mn) of the block copolymer is preferably 1.0 to 3.0, more preferably 1.0 to 1.5, and still more preferably 1.0 to 1.3. Mw indicates the weight average molecular weight.

The block copolymer composition of the present invention can be preferably used as a resin composition for forming a phase-separated structure. In the case of using the block copolymer of the present invention as a resin composition for forming a phase-separated structure, the block copolymer is preferably dissolved in an organic solvent to prepare a resin composition for forming a phase-separated structure.

Organic Solvent

The organic solvent may be any organic solvent which can dissolve the respective components to give a uniform solution, and one or more kinds of any organic solvent can be appropriately selected from those which have been conventionally known as solvents for a film composition containing a resin as a main component.

Examples thereof include lactones such as γ-butyrolactone; ketones such as acetone, methyl ethyl ketone, cyclohexanone, methyl-n-pentyl ketone, methyl isopentyl ketone, and 2-heptanone; polyhydric alcohols, such as ethylene glycol, diethylene glycol, propylene glycol and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as a monoalkylether (e.g., monomethylether, monoethylether, monopropylether or monobutylether) or monophenylether of any of these polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

These solvents can be used individually, or in combination as a mixed solvent.

Among these, propylene glycol monomethyl ether acetate (PGMEA), propylene glycol monomethyl ether (PGME), cyclohexanone and ethyl lactate (EL) are preferable.

Further, among the mixed solvents, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, more preferably from 2:8 to 8:2. For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME weight ratio is preferably from 1:9 to 9:1, more preferably from 2:8 to 8:2, and still more preferably 3:7 to 7:3. Alternatively, when PGME and cyclohexanone is mixed as the polar solvent, the PGMEA:(PGME+cyclohexanone) weight ratio is preferably from 1:9 to 9:1, more preferably from 2:8 to 8:2, and still more preferably 3:7 to 7:3.

Further, as the organic solvent for the resin composition for forming a phase-separated structure, a mixed solvent of γ-butyrolactone with PGMEA, EL or the aforementioned mixed solvent of PGMEA with a polar solvent, is also preferable. The mixing ratio (former:latter) of such a mixed solvent is preferably from 70:30 to 95:5.

The amount of the organic solvent in the resin composition for forming a phase-separated structure is not particularly limited, and is adjusted appropriately to a concentration that enables application of a coating solution depending on the thickness of the coating film. In general, the organic solvent is used in an amount that yields a solid content for the block copolymer that is within a range from 0.2 to 70% by weight, and preferably from 0.2 to 50% by weight.

Hereafter, among the blocks constituting the block copolymer, in an optional step described later, a block which is not selectively removed is referred to as "block $P_A$", and a block to be selectively removed is referred to as "block $P_B$".

By virtue of having the first block, the block copolymer of the present invention can reliably form a structure containing a perpendicular pattern suitable for microprocessing. The reason is presumed as follows.

By virtue of the block copolymer of the present invention having the first block, it is presumed that the balance of the hydrophilicity/hydrophobicity of each block constituting the block copolymer becomes particularly suitable for forming a perpendicular oriented pattern, and hence, a structure suitable for microprocessing can be preferably produced. In particular, it is presumed that, in the case the first block has a polar group on a side-chain terminal, the balance of the hydrophilicity/hydrophobicity becomes better.

<<Method of Producing Block Copolymer>>

A second aspect of the present invention is a method of producing a block copolymer, the method including a step A in which a block copolymer precursor is polymerized, and a step 13 in which a first block of the block copolymer precursor polymerized in step A is reacted with a compound containing an organic group having a polar group.

[Step (A)]

In step A, a block copolymer precursor is polymerized.

In step A, for example, by living anion polymerization or the like, a block corresponding to the second block is polymerized. Then, as shown in the reaction formula below, for example, a cyclotrisiloxane compound is reacted, and trimethylsilylchloride is used to temporarily terminate the reaction, so as to obtain a block copolymer precursor.

[Chemical Formula 17]

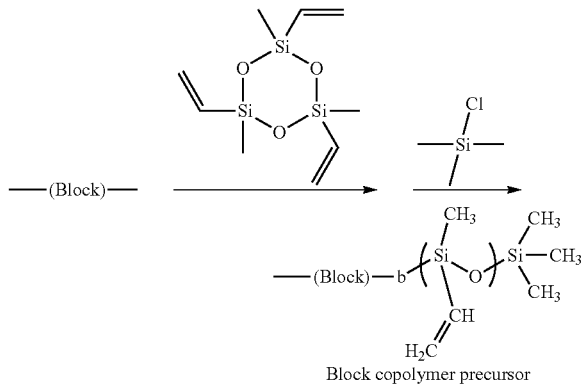

Block copolymer precursor

In the formula, at least one of $Rs^{01'}$ and $Rs^{02'}$ is an organic group, and $Re^{01'}$ and $Rs^{02'}$ may be the same or different from each other.

[Step (B)]

In step B, a first block of the block copolymer precursor polymerized in step A is reacted with a compound containing an organic group having a polar group. in step B, the compound containing an organic group having a polar group is preferably a compound having a thiol group.

By using a compound having a thiol group, a polar group can be introduced into the block copolymer precursor by an ene-thiol reaction.

According to the production method of the block copolymer of the present invention, the operability is good, and a block copolymer can be produced by an ene-thiol reaction which does not require a metal catalyst.

[Chemical Formula 18]

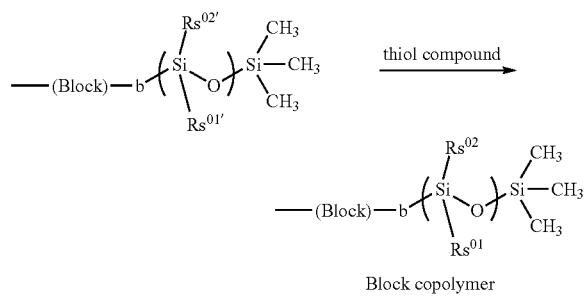

Block copolymer

In the formula, $Rs^{01}$, $Rs^{02}$, $Rs^{01'}$ and $Rs^{02'}$ each independently represents an organic group, provided that at least one of $Rs^{01}$ and $Rs^{02}$ has a polar group and at least one of $Rs^{01'}$ and $Rs^{02'}$ has a polar group.

In the formula, $Rs^{01'}$, $Rs^{02'}$, $Rs^{01}$ and $Rs^{02}$ are the same as defined above.

<<Method of Forming Structure Containing Phase-Separated Structure>>

The method of forming a structure containing a phase-separated structure by using the resin composition for forming a phase-separated structure according to the present invention will be described.

The method of producing a structure containing a phase-separated structure includes a step 1 in which a layer containing the block copolymer of the present invention is formed on a substrate, and a step 2 in which the layer containing the block copolymer is phase-separated.

In the method of producing a structure containing a phase-separated structure according to the present invention, prior to the step 1, it is preferable to include a step 0 in which a brush composition is applied to form a brush layer.

[Step 0]

In step 0, a brush layer containing a surface treating agent is formed.

<Substrate>

There are no particular limitations on the type of a substrate, provided that the resin composition for forming a phase-separated structure can be coated on the surface of the substrate. Examples of the substrate include a substrate constituted of an inorganic substance such as a metal (e.g., silicon, copper, chromium, iron or aluminum), glass, titanium oxide, silica or mica; and a substrate constituted of an organic substance such as an acrylic plate, polystyrene, cellulose, cellulose acetate or phenol resin.

Further, the size and the shape of the substrate used in the present invention is not particularly limited. The substrate does not necessarily need to have a smooth surface, and a substrate made of various materials and having various shapes can be appropriately selected for use. For example, a multitude of shapes can be used, such as a substrate having a curved surface, a plate having an uneven surface, and a thin sheet.

Further, on the surface of the substrate, an inorganic and/or organic film may be provided. As the inorganic film, an inorganic antireflection film (inorganic BARC) can be used. As the organic film, an organic antireflection film (organic BARC) can be used.

Before forming a brush layer on the substrate, the surface of the substrate may be cleaned. By cleaning the surface of the substrate, the later brush layer forming step may be satisfactorily performed.

As the cleaning treatment, a conventional method may be used, and examples thereof include an oxygen plasma treatment, a hydrogen plasma treatment, an ozone oxidation treatment, an acid alkali treatment, and a chemical modification treatment. For example, the substrate is immersed in an acidic solution such as a sulfuric acid/hydrogen peroxide aqueous solution, followed by washing with water and drying. Thereafter, a layer containing the resin composition for forming a phase-separated structure can be formed on the surface of the substrate.

<Brush Layer Forming Step>

In the present invention, firstly, the substrate is preferably subjected to a neutralization treatment. A neutralization treatment is a treatment in which the surface of the substrate is modified so as to have affinity for all polymers constituting the block copolymer. By the neutralization treatment, it becomes possible to prevent only phases of specific polymers to come into contact with the surface of the substrate by phase separation. For this reason, in order to form a phase-separated structure having a lamellar structure or a cylinder structure oriented in a direction perpendicular to the substrate surface, before forming a layer containing a block copolymer, it is preferable to form a layer of the brush layer on the substrate surface depending on the type of the block copolymer to be used.

Specifically, a thin film (brush layer) containing a surface treating agent having affinity for all polymers constituting the block copolymer is formed on the surface of the substrate.

As the brush layer, a film composed of a resin composition can be used. The resin composition used as the surface treating agent can be appropriately selected from conventional resin compositions used for forming a thin film, depending on the type of polymers constituting the block copolymer. The resin composition used as the surface treating agent may be a heat-polymerizable resin composition, or a photosensitive resin composition such as a positive resist composition or a negative resist composition.

Alternatively, a compound may be used as the surface treating agent, and the compound may be coated to form a non-polymerizable film as the neutralization film. For example, a siloxane organic monomolecular film formed by using a surface treating agent such as phenethyltrichlorosilane, octadecyltrichlorosilane or hexamethyldisilazane may be preferably used as a neutralization film.

The brush layer composed of such surface treating agent can be formed by a conventional method.

Examples of the surface treating agent include a resin composition containing all structural units of the polymers constituting the block copolymer, and a resin containing all structural units having high affinity for the polymers constituting the block copolymer.

For example, in the case of using the aforementioned block copolymer, as the surface treating agent, it is preferable to use a resin composition containing both the first block and the second block as the structural units.

[Step 1]

In the present invention, after conducting the step 0, it is preferable to form a layer containing a block copolymer on the brush layer.

More specifically, the block copolymer dissolved in a suitable organic solvent is applied to the brush layer using a spinner or the like.

[Step 2]

After the step 1, the layer containing the block copolymer on the brush layer is phase-separated.

The phase-separation of the layer containing a block copolymer (i.e., layer 3 is FIG. 1) is performed by heat treatment after the formation of the layer containing a block copolymer, thereby forming a phase-separated structure. The heat treatment is preferably conducted at a temperature at least as high as the glass transition temperature of the layer containing the mixture of the block copolymer used and lower than the heat decomposition temperature. The heat treatment temperature is, for example, preferably 80 to 270° C., more preferably 100 to 250° C., and most preferably 120 to 230° C. The heat treatment time is, for example, preferably 30 to 3,600 seconds, and more preferably 60 to 600 seconds.

Further, the heat treatment is preferably conducted in a low reactive gas such as nitrogen.

By the above heat treatment, a structure containing a phase separated structure in which the layer containing the block copolymer is phase-separated into a phase of $P_A$ block and a phase of $P_B$ block.

By conducting the above steps, a structure containing a phase-separated structure formed along the photosensitive resin pattern can be obtained. That is, according to the present embodiment, it is considered that the orientation of the phase-separated structure becomes controllable.

Further, in the present invention, a method in which a photosensitive resin composition or the like is used as a physical guide to control the orientation of the phase-separated pattern (graphoepitaxy) may be used. As the step of forming a guide pattern, it is preferable to include, prior to step 1, a step 01 in which a guide pattern is formed.

<Optional Step>

In the present invention, after step 2, a pattern may be formed by selectively removing a phase of at least one block of the plurality of blocks constituting the block copolymer from the layer containing the block copolymer.

Specifically, for example, after forming a phase-separated structure, from the layer containing a block copolymer on the substrate, at least a portion of the block within the $P_B$ block phase (phase 3a in FIG. 1) is selectively removed (decomposition into low molecules), so as to form a pattern. By selectively removing a portion of the block $P_B$ in advance, the solubility in a developing solution can be enhanced. As a result, the phase constituted of the block $P_B$ can be more reliably removed by selective removing than the phase constituted of the block $P_A$.

The selective removal treatment is not particularly limited, as long as it is a treatment capable of decomposing and removing the $P_B$ block without affecting the $P_A$ block. The selective removal treatment can be appropriately selected from any methods for removing a resin film, depending on the types of the $P_A$ block and the $P_B$ block. Further, when a neutralization film is formed on the surface of the substrate in advance, the neutralization film is removed together with the phase of the $P_B$ block. Examples of the removal treatment include an oxygen plasma treatment, an ozone treatment, a UV irradiation treatment, a heat decomposition treatment and a chemical decomposition treatment.

The substrate having a pattern formed by the phase-separation of the layer containing the block copolymer as described above may be used as it is, or a further heat treatment may be conducted to modify the shape of the polymeric nano structure on the substrate. The heat treatment is preferably conducted at a temperature at least as high as the glass transition temperature of the block copolymer used and lower than the heat decomposition temperature. Further, the heat treatment is preferably conducted in a low reactive gas such as nitrogen.

EXAMPLES

The present invention will be described more specifically with reference to the following examples, although the scope of the present invention is by no way limited by these examples.

Copolymer Synthesis Example

In an Ar atmosphere, 0.03 g of LiCl and 20 ml of THF were added to a reaction vessel, and cooled to −78° C. A predetermined amount of SecBuLi (a hexane/cyclohexane mixed solution) and 2.7 ml of styrene were added, followed by stirring at −78° C. for 30 minutes. Thereafter, 1.0 ml of trimethyltrivinylcyclotrisiloxane was added in a predetermined amount, and stirred at −78° C. for 10 minutes. Then, the temperature of the liquid was changed to −20° C., and stirring was further conducted for 48 hours. Then, 0.1 ml of trimethylsilylchloride was added, and the reaction solution was added to 200 ml of methanol. The precipitated solid was collected by filtration. The weight of the solid after drying was 2.6 g. The obtained block copolymer precursor had a Mn of 33,300, a PDI of 1.08 (in terms of GPC), a styrene: methylvinylsiloxane ratio of 77:23 (molar ratio) ($^1$H-NMR).

[Chemical Formula 19]

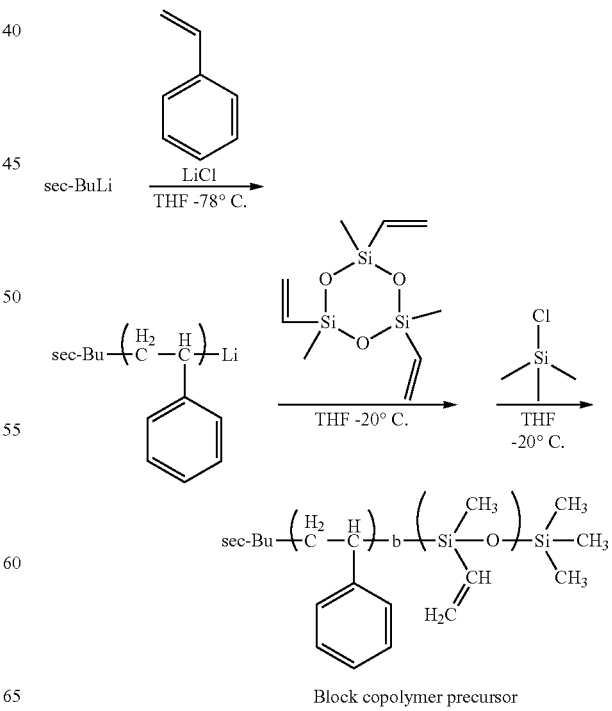

Block copolymer precursor

In a nitrogen atmosphere, 1 g of the block copolymer precursor, 0.05 g of AIBN, 0.4 g of 6-mercapto-1-hexanol and 10 ml of toluene were added to a reaction vessel, followed by stirring at 80° C. for 2 hours. To the reaction solution was added 100 ml of hexane, the precipitated solid was collected by filtration, and washing was conducted with 100 ml of methanol. The weight of the solid after drying was 1.1 g. The obtained block copolymer 1 had a Mn of 37,800, a PDI of 1.16 (in terms of GPC), and a styrene:siloxane derivative A ratio (a:b) of 77:23 (molar ratio) ($^{1}$H-NMR).

[Chemical Formula 20]

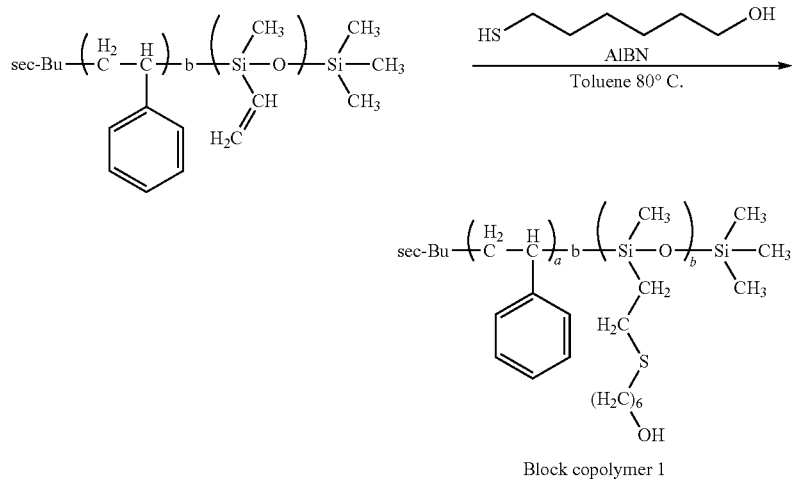

Block copolymer 1

Example 1

To an 8-inch silicon wafer, as a brush composition, a resin composition (a copolymer of methyl methacrylate/methacrylic acid=95/5 with Mw=43,400 and Mw/Mn=1.77) adjusted to a concentration of 1.0% by weight with PGMEA was applied using a spinner, followed by baking at 200° C. for 60 seconds and dried, so as to form a brush layer having a film thickness of 20 nm on the substrate.

Subsequently, portions of the brush layer other than that adhered to the substrate was removed by a solvent (PGMEA), and a solution of the block copolymer 1 (Example 1) (solvent; a mixed solvent of chloroform/methyl amyl ketone=3/1; 0.75 wt %) was spin-coated (number of rotation: 4,500 rpm, 60 seconds).

The coating film thickness of the layer containing the block copolymer 1 (hereafter, referred to as "layer of resin composition for forming phase-separated structure") was 34 nm.

The substrate having the resin composition for forming phase-separated structure coated thereon was heated under reduced pressure at 130° C. for 12 hours for annealing, so as to form a phase-separated structure.

Thereafter, a selective removal treatment of the block was conducted, so as to form a line and space pattern. The formed pattern was subjected to an image analysis, and the perpendicular orientation was evaluated. The results are shown in Table 1.

Comparative Examples 1 to 4

In Comparative Examples 1 to 4, phase-separated structures were formed in the same manner as in Example 1, except that block copolymers 2 to 5 shown below were used instead of block copolymer 1.

Thereafter, a selective removal treatment of the block was conducted, so as to form a line and space pattern. The formed pattern was subjected to an image analysis, and the perpendicular orientation was evaluated. The results are shown in Table 1.

TABLE 1

|  | Block copolymer | Perpendicular orientation |
| --- | --- | --- |
| Example 1 | Block copolymer 1 | ○ |
| Comparative Example 1 | Block copolymer 2 | x |
| Comparative Example 2 | Block copolymer 3 | x |
| Comparative Example 3 | Block copolymer 4 | x |
| Comparative Example 4 | Block copolymer 5 | x |

The structures of block copolymers 1 to 5 are shown below. In the following block copolymers 1 to 5, a:b=77:23 (molar ratio).

[Chemical Formula 21]

Block copolymer 1

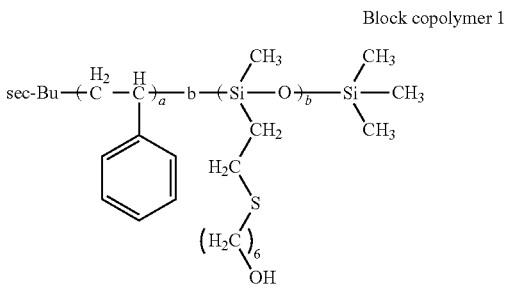

-continued

Block copolymer 2 sec-Bu—(CH₂—CH)ₐ—b—(Si(CH₃)₂—O)_b—Si(CH₃)₂—CH₃
         |
         phenyl

Block copolymer 3 sec-Bu—(CH₂—CH)ₐ—b—(Si(CH₃)(CH₂CH₂-S-(CH₂)₅CH₃)—O)_b—Si(CH₃)₂—CH₃
         |
         phenyl Block copolymer 4 sec-Bu—(CH₂—CH)ₐ—b—(Si(CH₃)(CH₂CH₂-S-(p-tolyl))—O)_b—Si(CH₃)₂—CH₃
         |
         phenyl Block copolymer 5 sec-Bu—(CH₂—CH)ₐ—b—(Si(CH₃)(CH₂CH₂-S-cyclohexyl)—O)_b—Si(CH₃)₂—CH₃
         |
         phenyl As seen from the results shown above, in the case where the block copolymer 1 according to the present invention was used, perpendicular orientation was observed. On the other hand, in Comparative Examples 1 to 4, a pattern could not be formed after the heat annealing.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A block copolymer containing a first block consisting of structural units represented by general formula (1-1) shown below:

$$\left(\begin{array}{c}R\\|\\Si-O\\|\\Y_s^{01}\\|\\R_s^{01a}\end{array}\right) \quad (1\text{-}1)$$

wherein R represents a hydrogen atom, an alkyl group of 1 to 5 carbon atoms or a halogenated alkyl group of 1 to 5 carbon atoms; $Y_s^{01}$ represents a divalent linking group; $R_s^{01a}$ represents an organic group having a polar group selected from the group consisting of formulae ($R_s^{01}$-1) to ($R_s^{01}$-11) shown below:

—OH  ($R_s^{01}$-1)

—SH  ($R_s^{01}$-2)

—NH₂  ($R_s^{01}$-3)

—HN—$R_s^{001}$  ($R_s^{01}$-4)

—COOH  ($R_s^{01}$-5)

—SO₃H  ($R_s^{01}$-6)

2-pyridyl  ($R_s^{01}$-7)

4-pyridyl  ($R_s^{01}$-8)

4-piperidyl (N-H)  ($R_s^{01}$-9)

—O—CH₃  ($R_s^{01}$-10)

(Rs^{01}-11)

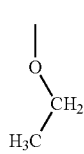

wherein Rs^{001} represents an organic group; and,
and a second block selected from the group consisting of:
- a block in which structural units derived from styrene or a styrene derivative are repeatedly bonded,
- a block in which structural units derived from an acrylate ester which may have the hydrogen atom bonded to the carbon atom on the α-position substituted with a substituent are repeatedly bonded,
- a block in which structural units derived from acrylic acid which may have the hydrogen atom bonded to the carbon atom on the α-position substituted with a substituent are repeatedly bonded,
- a block in which structural units derived from an alkyleneoxide are repeatedly bonded, and
- a block in which silsesquioxane structure-containing structural units are repeatedly bonded.

2. The block copolymer according to claim 1, which has a number average molecular weight of 5,000 to 2,000,000.

3. The block copolymer according to claim 1, wherein the weight ratio of the first block to the second block is 15:85 to 85:15.

4. A method of producing the block copolymer according to claim 1, the method comprising:
- a step A in which a block copolymer precursor is produced, and
- a step B in which a first block of the block copolymer precursor polymerized in step A is reacted with a compound containing an organic group having a polar group.

5. The method according to claim 4, wherein the step B is a reaction using an ene-thiol reaction.

6. A method of producing a structure containing a phase-separated structure, the method comprising:
- a step 1 in which a layer containing the block copolymer according to claim 1 is formed on a substrate, and
- a step 2 in which the layer containing the block copolymer is phase-separated by heat treatment.

7. The method according to claim 6, further comprising, prior to the step 1, conducting a neutralization treatment of the substrate.

8. The block copolymer according to claim 1, wherein the structural unit represented by general formula (1-1) is a structural unit represented by general formula (1-1-1) or (1-1-2) shown below:

(1-1-1)

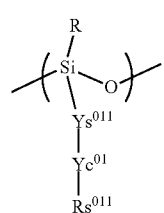

(1-1-2)

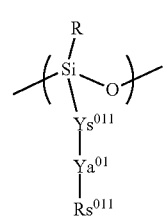

wherein R represents a hydrogen atom, an alkyl group of 1 to 5 carbon atoms or a halogenated alkyl group of 1 to 5 carbon atoms; $Ys^{011}$ represents a divalent linking group which may contain a sulfur atom or a silicon atom; $Yc^{01}$ represents a divalent cyclic group; $Ya^{01}$ represents a linear or branched alkylene group; and $Rs^{011}$ represents a functional group selected from the group consisting of formulae ($Rs^{01}$-1) to ($Rs^{01}$-11) shown below (Rs^{01}-1)

(Rs^{01}-2)

(Rs^{01}-3)

(Rs^{01}-4)

(Rs^{01}-5)

(Rs^{01}-6)

(Rs^{01}-7)

(Rs^{01}-8)

(Rs^{01}-9)

(Rs^{01}-10)

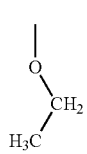

(Rs⁰¹-11)

wherein $Rs^{001}$ represents an organic group; and * represents that the atom drawn to * binds to an atom in the divalent cyclic group represented by $Yc^{01}$ or the linear or branched alkylene group represented by $Ya^{01}$.

9. The method according to claim 4, wherein step A comprises producing a block copolymer having a first block and a second block by polymerizing a block corresponding to the second block, and reacting a 1,3,5-trimethyl-1,3,5-trivinylcyclotrisiloxane compound.

10. The method according to claim 9, wherein step B comprises reacting the first block of the block copolymer precursor polymerized in step A with a compound having a thiol group to effect an ene-thiol reaction.

* * * * *